United States Patent [19]

Khutoretsky et al.

[11] 4,204,313
[45] May 27, 1980

[54] METHOD OF ASSEMBLING STATOR CORE OF ELECTRIC MACHINE INSIDE THE HOUSING THEREOF

[76] Inventors: Garri M. Khutoretsky, Altaiskaya ulitsa, 20, kv. 5; Vladimir M. Fridman, Grazhdansky prospekt, 13, korpus 1, kv. 170; Galina A. Zagorodnaya, Altaiskaya ulitsa, 20, kv. 5; Alexandr I. Vorontsov, Pushkin, ulitsa Khazova, 43, kv. 94; Anatoly D. Ignatiev, ulitsa Basseinaya, 85, kv. 162; Vasily L. Sudarikov, ulitsa Bela Kuna, 13, kv. 32, all of Leningrad, U.S.S.R.

[21] Appl. No.: 34,385
[22] Filed: Apr. 30, 1979
[51] Int. Cl.² ........................................... H02K 15/14
[52] U.S. Cl. ....................................... 29/596; 310/42; 310/51; 310/91
[58] Field of Search ........................ 29/596, 598, 450; 310/42, 89, 91, 51, 254, 258, 259

[56] References Cited

U.S. PATENT DOCUMENTS 4,145,626   3/1979   Aroshidze et al. ............ 310/51 X Primary Examiner—Carl E. Hall
Attorney, Agent, or Firm—Lackenbach, Lilling & Siegel

[57] ABSTRACT

A method of assembling a stator core of an electric machine inside the housing thereof comprises securing resilient coupling ribs with their resilient portions to the housing, the resilient portions of the ribs being previously urged against the supporting portion of the ribs up to an elastic deformation state by means of detachable clamping members, assembling core segments on the core supporting portions of the resilient coupling ribs, compressing the core segments, securing the core under compression to the ribs, and removing of the detachable clamping members when the core is secured to the resilient coupling ribs.

2 Claims, 3 Drawing Figures

METHOD OF ASSEMBLING STATOR CORE OF ELECTRIC MACHINE INSIDE THE HOUSING THEREOF

1. Field of the Invention

The present invention relates to electric machines, and more particularly, to methods of assembling a stator core of an electric machine inside the housing thereof. Most advantageously the invention can be used in large electric machines, such as turbo generators.

2. Background of the Invention

When operating a large electric machine, its stator core is subjected to distortion as a result of its interaction with the magnetic field of the moving rotor. The cross-sectional distortion of the stator core is of an elliptical shape and, when applied to a two pole turbo generator, rotates with a speed equal to a double speed of the rotor, thus exciting radial and tangential core vibrations. These vibrations are transmitted to the housing of an electric machine and to its base, induce an increased acoustic noise, and can result in fatigue damage of the members securing the core to the housing, of the housing itself, and of the equipment and facilities mounted on the base adjacent to the electric machine. To minimize the transmission of the stator core vibration to the housing and base, a resilient support of the stator core inside the electric machine housing is used.

In worldwide practice of electric machine engineering, it has been known to provide or spread a support, of an electric machine stator core, inside the housing by means of longitudinal resilient coupling ribs secured to the core by keys of dovetail or rectangular prism type and providing clamping of the core in an axial direction. The resilience of the coupling ribs is achieved by milling through longitudinal slots therein, and dividing the ribs into resilient portions and core supporting portions.

Assembling a stator core of the described construction inside the electric machine housing is performed according to the following steps (cf., e.g., "The Technology of Large Electric Machine Engineering" by D. I. Blumencrantz et al., "Energiya" Publishing House, Moscow, 1966, Part I, p.p. 96–106). Resilient coupling ribs are secured with their resilient portions to cross walls of the housing by means of welding or by bolts. At one end of the housing a core clamping plate is mounted, than the core segments having appropriate slots to receive dovetail keys of the ribs are assembled upon the core supporting parts of the ribs. The core segments are compressed, a second clamping plate is mounted at the other end of the housing, and the compressed core segments coupled with the clamping plate are fixed with nuts screwed onto threaded portions formed on the rib ends.

The disadvantage of the described method is the loosening of the fit of the core segments on the ribs during operation of an electric machine as a result of the core vibration. That loosening of the fit is particularly prominent in the upper part of the core. This is due to the fact that the upper ribs are but slightly stressed by the core weight, since the radial distortions appearing therein due to the core weight, and an increase in core diameter, when compressed, are oppositely directed and mutually balanced out. In the operation of an electric machine, and as a result of vibration, the contacting surfaces of the rib dovetails in the core slots are worn out, clearances are increased, and the upper ribs can be wholly relieved of stress. The unstressed upper ribs can perform independent oscillations of high amplitudes and impact against the walls of the slots, which may cause an increase in the noise of the machine and result in damage to the stator core supporting members.

SUMMARY OF THE INVENTION

It is an object of the present invention to provide a method of assembling a stator core of an electric machine inside the housing thereof, wherein during operation of an electrical machine loosening of the fit of the core mounted on resilient coupling ribs secured to the housing.

It is another object of the present invention to decrease the noise level during operation of an electric machine.

It is still another object of the present invention to provide a reliable mounting of a stator core of an electric machine inside the housing.

With these and other objects in view, there is proposed a method of assembling a stator core of an electric machine inside the housing, comprising securing resilient coupling ribs having resilient portions and core supporting portions to the housing with their resilient portions, assembling core segments on the core supporting portions of the ribs, compressing the core segments and securing the core segments under compression to the ribs, and wherein prior to securing the resilient coupling ribs to the housing, their resilient portion are urged against the core supporting portions up to an elastic deformation state by means of detachable clamping members which are removed when the core segments are secured to the resilient coupling ribs.

The proposed method of assembling a stator core of of an electric machine on resilient coupling ribs previously pressed up to a state of elastic deformation provides a tight fit of the core on the ribs, since, when the clamping members are removed, the resilient portions of the ribs tend to straighten, thus providing a constant pressing of the ribs against the core. The tight fit of the core on the resilient coupling ribs eliminates developing of clearances between the ribs and the core during operation of the electric machine, which leads to a decrease in the wear of the ribs and a decrease in the noise level of the operating machine.

These and other objects and advantages of the invention will become more apparent upon consideration of the following detailed description of its preferred embodiment taken in conjunction with the accompanying drawings.

DETAILED DESCRIPTION OF THE PREFERRED EMBODIMENT OF THE INVENTION

Figure 1:
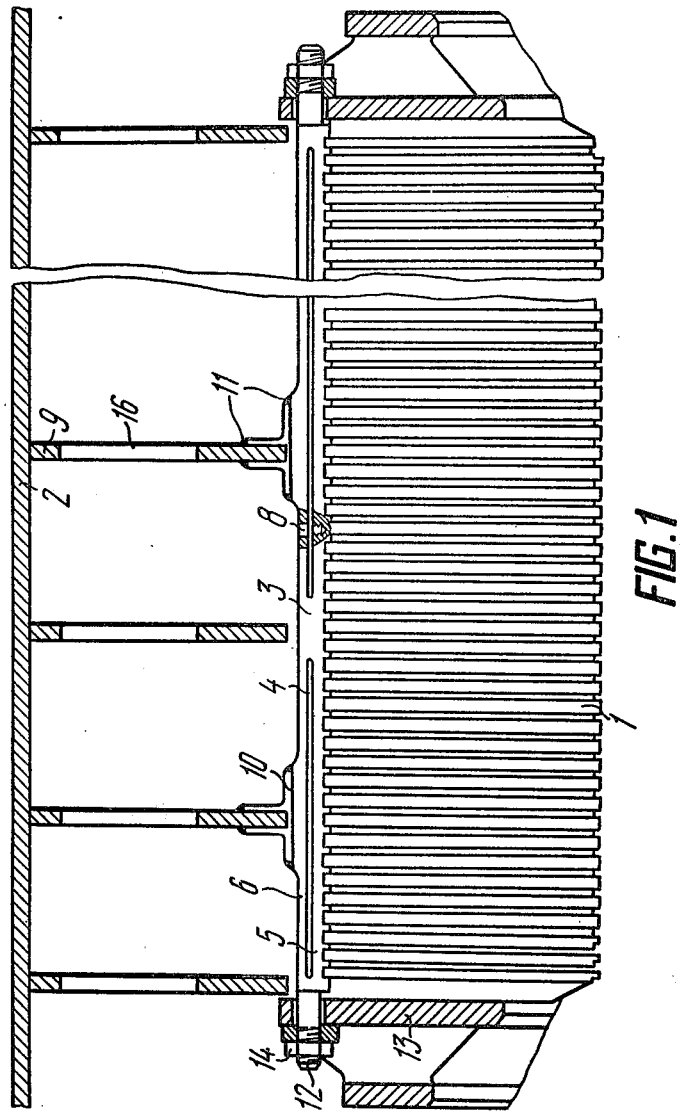
FIG. 1 is a longitudinal sectional view of a stator core of an electric machine, assembled inside the housing.

A core 1 (FIG. 1) of a stator of an electric machine is supported in a housing 2 by means of resilient coupling ribs 3 extending in parallel to the stator axis and equally spaced around the periphery of the core 1 to compress it symmetrically. The coupling ribs 3 have longitudinally milled through slots 4 imparting resilience to the ribs 3 forming in the body of the rib 3 a core supporting, or radially inner portion 5, and a resilient radial outer portion 6.

Figure 2:
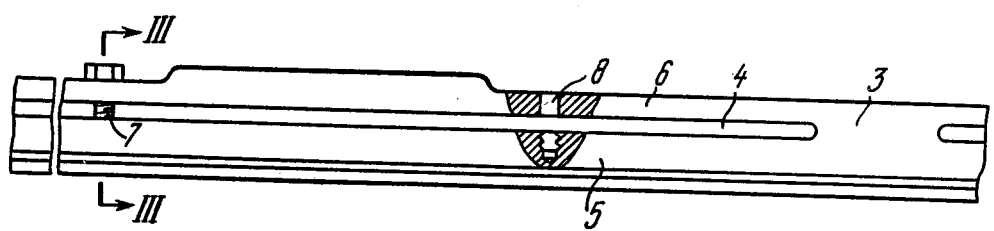
FIG. 2 is an enlarged fragmentary view of the resilient coupling rib for supporting the stator core shown in FIG. 1.

Assembling of the core 1 of the stator inside the housing 2 of the electric machine, according to the invention, is performed as follows. Initially, the resilient portions 6 of the ribs 3 are urged by means of detachable clamping members towards the core supporting portions 5 up to a state of elastic deformation. Such clamping means or members in the described embodiment of the invention are bolts 7 (FIG. 2) which are positioned into bores 8 drilled in the ribs 3, the bores 8 having threaded portions only in the core supporting portion 5 of the ribs 3. The resilient portions 6 of the ribs 3 are bent and displaced towards the core supporting portions 5.

To provide the urging of the resilient portions 6 of the ribs 3 towards the core supporting portions 5 other kinds of detachable clamping members can be used, such as clamps, which are mounted on the sides of the ribs 3 along their slot portions. In that case, there is no need in drilling the threaded bores 8 in the ribs 3.

The resilient ribs 3 accommodating the bolts 7 are secured with their resilient portions 6 to annular walls 9 (FIG. 1) of the housing 2 by means of, e.g., joint angles 10 and weldings 11. Then, at one end face of the housing 2 a clamping plate 13 is mounted on the cylindrical threaded end portions 12 of the ribs 3 and is secured by nuts 14.

Figure 3:
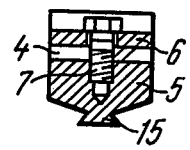
FIG. 3 is a cross sectional view along the line III—III of FIG. 2.

The core supporting portions 5 of the ribs 3 are provided with keys 15 (FIG. 3), suitably of a dovetail type arranged along the length of the segments of the core 1 (FIG. 1), and said keys facing the stator axis. A certain number of segments of the core 1 are mounted on said keys, and the segments are provided with appropriate slots (not shown) to receive the keys. The segments of the core 1 are then compressed under specific pressure of 10 to 12 kg/sq cm. Furtheron, on the ribs 3, other parts of the segments of the core 1 are similarly mounted in succession and compressed, until the whole of the core 1 is assembled, with the specific pressure being increased with every compression.

At the other end of the housing 2, a second clamping plate 13 is mounted on the threaded portions 12 of the ribs 3, and a final compression of the segments of the core 1 together with the clamping plate 13 is carried out, with the specific pressure being in the range from 17 to 20 kg/sq cm. The segments of the core 1 are secured under pressure to the ribs 3 by the nuts 14.

Then, the bolts 7 (FIG. 2) are screwed out from the ribs 3. To gain access to the bolts 7 in the assembled core 1 (FIG. 1), the annular walls 9 of the housing 2 are provided with openings 16.

After the bolts 7 are removed, the ribs 3 secured to the walls 9 (FIG. 1) of the housing 2 tend to straighten the slots 4 and to displace in a radial direction towards the stator axis. As a result, the core supporting portions 5 of the ribs 3 are forced against the bottoms of the slots (not shown) of the segments of the core 1, which are designed to receive the dovetail keys 15 (FIG. 3), and provide a tight fit of the core 1 (FIG. 1) on the ribs 3. A tight fit of the core 1 on the ribs 3 ensures a uniform functioning of the ribs 3 during operation of the electric machine.

The amount of pressing of the ribs 3 against the core 1 and the respective bending of the resilient portions 6 of the ribs 3 are chosen so as, on the one hand, to provide an elastic deformation of the resilient portions 6 of the ribs 3, and on the other hand, to eliminate the loosening of the ribs 3 during operation of the electric machine.

Thus, due to pre-stressing of the resilient portions 6 of the ribs 3 to an elastic deformation state by means of the detachable clamping members 7 (FIG. 2) prior to fixing the ribs 3 inside the housing 2 (FIG. 1), and removal of the clamping members 7 (FIG. 2) after securing the core 1 inside the housing 2, a tight fit of the ribs 3 in the core 1 is provided, thus preventing clearances from developing between the core 1 and the ribs or precluding the core 1 from becoming loosened during operation of the electric machine. Clearly, such novel invention results in an increase in the reliability of the electric machine.

If is to be understood that the present invention is not limited to the embodiment herein described and illustrated, and that numerous modifications and other embodiments are possible without departing from the scope of the invention defined by the following claim.

We claim:

1. A method of assembling a stator core, having stator core segments, of an electric machine, supported in a housing by means of resilient coupling ribs having resilient portions and core supporting portions, comprising the following steps:

urging said resilient portions of said resilient coupling ribs towards said core supporting portions up to a state of elastic deformation by means of detachable clamping members;

securing said coupling ribs to said housing with said resilient portions;

assembling stator core segments on said core supporting portions of said resilient coupling ribs;

compressing said core segments;

securing said core segments to said resilient coupling ribs, said core segments being under compression; and removing said detachable clamping members from said resilient coupling ribs;

whereby a tight fit of the core on said resilient coupling ribs during operation of the electric machine is retained.

2. The method according to claim 1, wherein said clamping members comprise fasteners having threaded portion only in the core supporting portion of said ribs for engagement with threaded bores in said ribs.

* * * * *